United States Patent
Weber

(10) Patent No.: US 8,023,184 B2
(45) Date of Patent: Sep. 20, 2011

(54) DEVICE AND METHOD FOR HIGH-INTENSITY UNIFORM ILLUMINATION WITH MINIMAL LIGHT REFLECTION FOR USE IN MICROSCOPES

(75) Inventor: Mark A. Weber, Moers (DE)

(73) Assignee: NanoFocus AG, Oberhausen (DE)

( * ) Notice: Subject to any disclaimer, the term of this patent is extended or adjusted under 35 U.S.C. 154(b) by 216 days.

(21) Appl. No.: 12/226,404

(22) PCT Filed: Apr. 13, 2007

(86) PCT No.: PCT/DE2007/000634
§ 371 (c)(1),
(2), (4) Date: Oct. 17, 2008

(87) PCT Pub. No.: WO2007/121705
PCT Pub. Date: Nov. 1, 2007

(65) Prior Publication Data
US 2009/0103175 A1 Apr. 23, 2009

(30) Foreign Application Priority Data
Apr. 20, 2006 (DE) .......... 10 2006 018 721

(51) Int. Cl.
*G02B 21/06* (2006.01)
*G02B 21/00* (2006.01)

(52) U.S. Cl. ........................ 359/385; 359/368
(58) Field of Classification Search .......... 359/368–390, 359/227–234, 738–740
See application file for complete search history.

(56) References Cited

U.S. PATENT DOCUMENTS

| | | | | |
|---|---|---|---|---|
| 3,637,280 | A | * | 1/1972 | Beyer et al. .................... 359/370 |
| 4,852,985 | A | * | 8/1989 | Fujihara et al. ............... 359/387 |
| 5,099,354 | A | * | 3/1992 | Lichtman et al. ............. 359/389 |
| 5,861,984 | A | | 1/1999 | Schöppe |
| 6,031,661 | A | * | 2/2000 | Tanaami ....................... 359/368 |
| 6,862,137 | B2 | | 3/2005 | Ott |
| 2003/0227674 | A1 | * | 12/2003 | Nihoshi et al. ................ 359/386 |
| 2004/0227944 | A1 | * | 11/2004 | Fukui et al. ................... 356/401 |

FOREIGN PATENT DOCUMENTS

| | | |
|---|---|---|
| EP | 0 841 584 | 5/1998 |
| EP | 1 237 029 | 9/2002 |
| JP | 56-140313 | 11/1981 |
| JP | 59-111124 | 6/1984 |

OTHER PUBLICATIONS

International Search Report.

* cited by examiner

Primary Examiner — Thong Nguyen
(74) Attorney, Agent, or Firm — Collard & Roe, P.C.

(57) ABSTRACT

A device for high-intensity uniform illumination with minimal light reflection for use in reflective-type microscopes has a light source with a uniform emission and the following components, arranged in succession in the emission direction: a lens combination with a short focal length, the focal length of the lens combination being adjusted in such a way that the light source is projected to infinity; a rectangular diaphragm aperture, which is located on the rear focal plane of the lens combination, the Fourier plane of the lens combination being situated on the plane; an additional lens with a focal length, through which the rectangular diaphragm aperture is projected onto the intermediate image plane of the microscope; and a circular diaphragm, onto which the light source is projected in sharp focus and which is located on the rear focal plane of the additional lens.

4 Claims, 1 Drawing Sheet

DEVICE AND METHOD FOR HIGH-INTENSITY UNIFORM ILLUMINATION WITH MINIMAL LIGHT REFLECTION FOR USE IN MICROSCOPES

CROSS REFERENCE TO RELATED APPLICATIONS

This application is the National Stage of PCT/DE2007/000634 filed on Apr. 13, 2007, which claims priority under 35 U.S.C. §119 of German Application No. 10 2006 018 721.0 filed on Apr. 20, 2006. The international application under PCT article 21(2) was not published in English.

BACKGROUND OF THE INVENTION

The method described here serves, in microscopes that work with reflection, for suitable formation of the illumination beam at a high light yield, and for adaptation of the illumination aperture to the entry pupil of the microscope lens. Using this invention, it is possible to create new possibilities of use for relatively low-intensity light sources. In particular, the use of LED light sources in microscopes that work confocally, which are considered to be very low-intensity, is made possible by means of this invention. The influence of internal light reflections is significantly reduced by means of suitable diaphragm positioning.

SUMMARY OF THE INVENTION

A device for high-intensity uniform illumination with minimal light reflection for use in reflective-type microscope has a light source with a uniform emission and the following components, arranged in succession in the emission direction: a lens combination with a short focal length, the focal length of the lens combination being adjusted in such a way that the light source is projected to infinity; a rectangular diaphragm aperture, which is located on the rear focal plane of the lens combination, the Fourier plane of the lens combination being situated on the plane; an additional lens with a focal length, through which the rectangular diaphragm aperture is projected onto the intermediate image plane of the microscope; and a circular diaphragm, onto which the light source is projected in sharp focus and which is located on the rear focal plane of the additional lens.

DETAILED DESCRIPTION OF THE PREFERRED EMBODIMENTS

Figure 1:
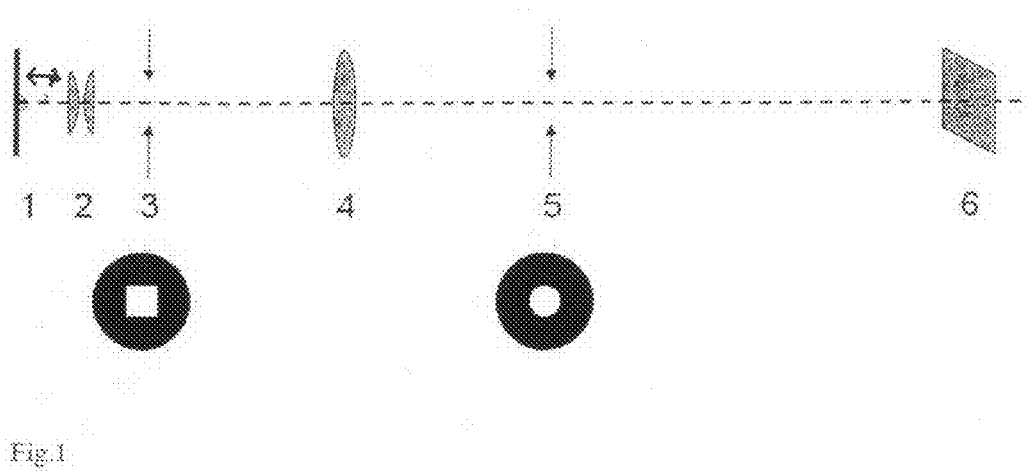
FIG. 1) fundamental sketch concerning formation of the light beam for homogeneous image illumination on a defined area FIG. 2) fundamental sketch concerning projection of the pupils

FIG. 1) shows the principle for homogenization of the illumination of the intermediate image for use in microscopes, with a minimal loss of illumination intensity and minimized formation of reflections. Light that cannot get into the entry pupil of the microscope lens being used is already blocked out by means of the diaphragm combination used, in order to eliminate light reflections. In this case, without any restriction in generality, a LED (1) is to be used as the light source. This should be structured as a Lambert emitter, if possible, and should emit light as homogeneously as possible. A lens combination (2) having as short a focus as possible follows, having the focus $f_1$ (e.g. $f_1$=10-15 mm), which is adjusted in such a way that the emitter in the LED is projected into infinity, in other words is at the focus of the lens combination. The sharper the emitter can be projected into infinity, the fewer problems with indefinite light reflections will occur in the following. A rectangular diaphragm aperture (3) is used in the rear focal plane of the lens combination. The aperture must be fully illuminated and is not allowed to be partially shaded by possible additional diaphragms. The Fourier plane of the lens combination (2) is situated in this plane, and for this reason, the illumination is defined, here, by the angle distribution of the emitted light intensity. Because of the Lambert characteristic of the beam profile, very homogeneous illumination of the diaphragm is therefore present at this location. This diaphragm is projected to the intermediate image plane (6) in the microscope, using another lens (4) having the focal width $f_2$ (e.g. $f_2$=50 mm). As a result, the intermediate image plane is homogeneously illuminated. A circular diaphragm (5) is used in the rear focal plane of the lens (4). The emitter of the LED (1) is projected sharply on this diaphragm. The magnification of the emitter corresponds to the focal width ratio $V=f_2/f_1$. At an emitter size of approximately 1 mm (high-power LED), this means illumination of the diaphragm (5) at a diameter of approximately 4-5 mm, at the proposed focal widths. To increase the light yield in the microscope, the diaphragm should be minimally larger, if possible. The magnification $V_2=b_2/g_2$ that can be achieved with the lens (4) is calculated from the quotient of the desired diagonal of the illuminated intermediate image (6) and the diagonal of the rectangular diaphragm (3). In this connection, $b_2$ is the distance between intermediate image plane (6) and lens (4), and $g_2$ is the distance between rectangular diaphragm (3) and lens (4). Therefore, if the intermediate image is supposed to have a diagonal of 22.6 mm at a diaphragm diagonal of 11.3 mm, the magnification turns out to be $V_2$=2, in other words $b_2=2 \cdot g_2$ at $g_2=1.5 \cdot f_2$ and $b_2=3 \cdot f_2$. The distance between perforated diaphragm (5) and intermediate image (6) is calculated at $d=b_2-f_2=2 \cdot f_2$.

Figure 2:
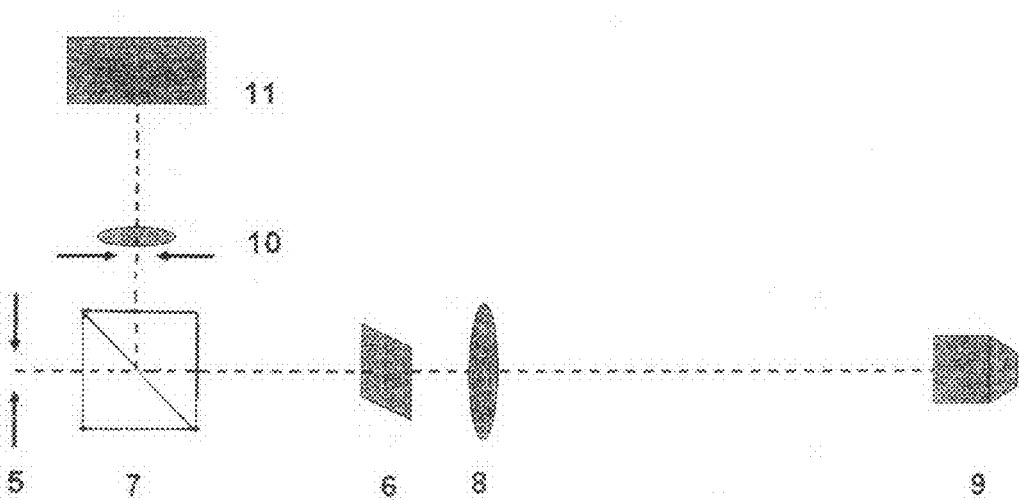

FIG. 2) shows a typical beam path in a reflection-light microscope or a confocal microscope, with illumination through the microscope lens. In this connection, the perforated diaphragm (5), which corresponds to the perforated diaphragm (5) from FIG. 1), is projected onto the entry pupil of the microscope lens (9), by means of the field lens (8). The image of the emitter is therefore situated on the entry pupil of the lens, shows itself behind the lens as an angle distribution, and only becomes clearly visible behind the focal plane of the lens. The illumination of the sample approximately corresponds to the illumination in the intermediate image plane (6), where the confocal filter disk is typically situated. In the detection branch, the light reflected back by the sample is first projected onto the intermediate image plane (6). The field lens (8), which is situated close to the intermediate image plane, having the focal length $f_3$, focuses the pupil of the microscope lens onto the pupil of the projection lens (10), by way of the beam splitter (7). The projection lens (10) projects the intermediate image (6) onto the detector matrix (11), typically a CCD camera. The optical path that lies between intermediate image plane and diaphragm (5) and projection lens (10), respectively, should have an identical length, in order to achieve maximal illumination.

At a tube length of 160 mm, for example, a magnification of the diaphragm (5) of maximally 1.6 is obtained, to continue the above example. This means that a diaphragm diameter (5)

of 5 mm in the illumination branch is projected onto a pupil diameter of 8 mm, and focused onto a spot diameter again in the detection branch.

At $f^1=b^{-1}+g^{-1}$, a focal width $f_3$ of 61.5 mm is obtained for the case that the field lens is situated approximately in the intermediate image plane.

The invention claimed is:

1. A microscope that works reflectively comprising a device for high-intensity homogeneous illumination, with minimized light reflections, said device comprising:
    a light source formed by a light emitting diode having an emitter that emits homogeneously in an emission direction;
    a lens combination with a first focal length of 10 mm to 15 mm disposed in the emission direction, a first rear focal plane and a Fourier plane situated in the first rear focal plane;
    a rectangular diaphragm aperture disposed in the first rear focal plane;
    an additional lens with a second focal length and a second rear focal plane; and
    a circular diaphragm disposed in the second rear focal plane;
    wherein said first focal length of said lens combination is adjusted in such a way that the emitter of said light source is projected into infinity;
    wherein said rectangular diaphragm aperture is projected as an illuminated intermediate image onto an intermediate image plane of the microscope in a shape of a rectangle by using said additional lens;
    wherein light from said light source is sharply projected onto said circular diaphragm; and
    wherein the following holds true:
    a) each of the illuminated intermediate image and the rectangular diaphragm aperture have a respective diagonal and with the additional lens a magnification $V_2=b_2/g_2$ can be achieved that is calculated from a quotient of the diagonal of the illuminated intermediate image and the diagonal of the rectangular diaphragm aperture, wherein $b_2$ is a first distance between the intermediate image plane and the additional lens, and $g_2$ is a second distance between the rectangular diaphragm aperture and the additional lens,
    b) the emitter of the light source has a magnification that corresponds to a focal length ratio $V=f_2/f_1$, wherein $f_1$ is the first focal length and $f_2$ is the second focal length, and
    c) a third distance between the circular diaphragm and the illuminated intermediate image is calculated at $d=b_2-f_2$.

2. The microscope according to claim 1, wherein the light source is structured as a Lambert emitter.

3. The microscope according to claim 1, wherein a field lens is disposed between the circular diaphragm and a lens of the microscope, and a beam splitter is provided between the circular diaphragm and the intermediate image plane, by way of which splitter the pupil of the microscope lens is projected onto the pupil of a projection lens having a third focal length, wherein said projection lens projects the illuminated intermediate image onto a detector.

4. The microscope according to claim 3, wherein the optical path between the intermediate image plane and the circular diaphragm has an identical length with that of the optical path between the intermediate image plane and the projection lens.

* * * * *